United States Patent [19]

Daikoku et al.

[11] Patent Number: 4,602,681

[45] Date of Patent: Jul. 29, 1986

[54] HEAT TRANSFER SURFACE WITH MULTIPLE LAYERS

[75] Inventors: Takahiro Daikoku, Ibaraki; Wataru Nakayama, Kashiwa; Tadakatsu Nakajima; Heikichi Kuwahara, both of Ibaraki; Hiromichi Yoshida, Hitachi, all of Japan

[73] Assignee: Hitachi, Ltd. & Hitachi Cable, Ltd., Tokyo, Japan

[21] Appl. No.: 545,644

[22] Filed: Oct. 26, 1983

[30] Foreign Application Priority Data

Nov. 4, 1982 [JP] Japan ................... 57-192480

[51] Int. Cl.$^4$ .............. F28F 13/00; F25B 39/02
[52] U.S. Cl. .................... 165/133; 62/527
[58] Field of Search ....... 165/133, DIG. 14, DIG. 10; 62/527

[56] References Cited

U.S. PATENT DOCUMENTS

| | | | |
|---|---|---|---|
| Re. 30,077 | 8/1979 | Kun et al. | 165/DIG. 14 |
| 3,971,435 | 7/1976 | Peck | 165/133 |
| 4,284,133 | 8/1981 | Gianni et al. | 62/527 |
| 4,434,842 | 3/1984 | Gregory | 165/133 |
| 4,458,748 | 7/1984 | Yamada et al. | 165/133 |

FOREIGN PATENT DOCUMENTS

| | | | |
|---|---|---|---|
| 0011465 | 1/1977 | Japan | 165/133 |
| 0009160 | 1/1977 | Japan | 165/133 |
| 0016048 | 2/1977 | Japan | 165/133 |
| 0014260 | 2/1977 | Japan | 165/133 |
| 0017559 | 2/1979 | Japan | 165/133 |
| 0142649 | 11/1979 | Japan | 165/133 |
| 0059194 | 5/1981 | Japan | 165/133 |

OTHER PUBLICATIONS

Webb, R. L., "The Evolution of Enhanced Surface Geometries for Nucleate Boiling" Heat Transfer Engineering, vol. 2, No. 3, 4 Jan–Jun. 1981, pp. 46–68.

*Primary Examiner*—William R. Cline
*Assistant Examiner*—John K. Ford
*Attorney, Agent, or Firm*—Antonelli, Terry & Wands

[57] ABSTRACT

In a heat transfer wall provided with a plurality of cells and restricted holes, the cells are formed in a plurality of laminated layers in a direction from an outer surface of the heat transfer wall to an inside thereof, and the cells of the upper and lower layers and the outside of the outer surface are communicated to one another through the holes.

3 Claims, 21 Drawing Figures

HEAT TRANSFER SURFACE WITH MULTIPLE LAYERS

BACKGROUND OF THE INVENTION

1. Field of the Invention

The present invention relates to a heat transfer surface capable of transferring heat by phase-converting liquids which are brought into contact with outer surfaces of its planar plate or heat-transfer tube, and more particularly, to a heat exchange wall for use in a evaporator or radiator.

2. Description of the Prior Art

There have been heretofore proposed a number of techniques as to a heat transfer surface for enhancing boiling or evaporating heat transfer.

It has been proposed to roughen the heat transfer surface by sintering, radiation-melting or edging methods to form a porous layer thereon. The wall having such a porous layer is known to exhibit better heat transfer characteristic than that of a conventional planar wall. However, in such a porous layer, since voids or cells formed therein are small, impurities contained in boiling liquid or non-boiling liquid contained therein will enter into the voids or cells to clog them so that the heat transfer performance of the wall will be degraded. Also, since the voids or cells formed in the porous layer are non-uniform in size or dimension, the heat transfer performance is locally changed.

On the other hand, as shown in U.S. Pat. No. 4,060,125 or U.S. Pat. No. Re. 30,077, there has been known a heat exchange wall having a number of tunnels or voids formed under its surface layer and a number of openings allowing the tunnels or voids to open to the outside of the heat transfer surface. Such a heat transfer surface possesses a high heat transfer performance. The openings are larger in size than those of the porous layer obtained through the sintering method, and in the wall having the tunnels and openings a possible degradation in performance due to clogging of impurity, non-boiling liquid and the like is small.

However, the heat transfer surface having the tunnels or voids and the openings requires an optimum openings diameter in compliance with a thermal load imposed to the heat transfer surface. Therefore, when the thermal load is excessively small or large, its heat transfer performance will be degraded.

SUMMARY OF THE INVENTION

An object of the invention is to provide a heat transfer surface having a structure capable of effectively achieving the phase-conversion of liquid with a high heat transfer performance which is stable.

According to the invention, there is provided a heat transfer surface having a multiplicity of void groups and holes, characterized in that a multiplicity of layers of void groups are formed in a direction from an outer surface of the heat transfer wall to the inside thereof and voids of the respective layers and voids of the outermost layer are communicated with each other through holes.

BRIEF DESCRIPTION OF THE DRAWINGS

In the accompanying drawings.

DESCRIPTION OF THE PREFERRED EMBODIMENTS

Figure 1:
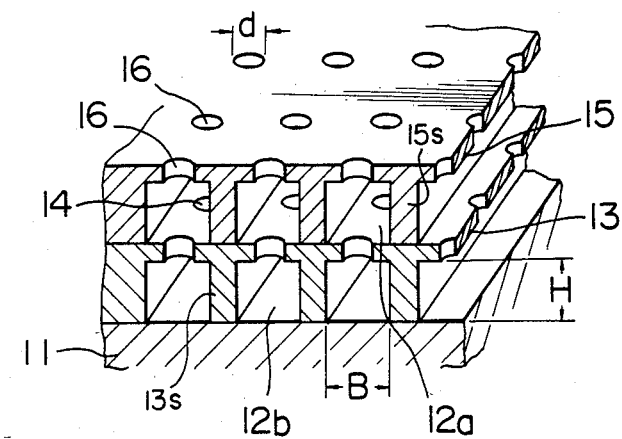
FIGS. 1 and 2 are perspective views, fragmentary in part, of heat transfer walls in accordance with embodiments of the invention.

The present invention will now be described with reference to the accompanying drawings.

Reference will now be made to the embodiment shown in FIG. 1. A multiplicity of elongated groove-like void or cell groups 12 (12a, 12b) are provided in parallel on an outer surface layer 11 of a heat transfer wall to form two layers. The cell groups are partitioned by side walls 13s and 15s as shown in the drawings. In a partitioning wall 13 between the two layers of voids or cells 12a, 12b, there are formed a multiplicity of holes 14 having cross sections smaller than maximum cross sections of the lower layer of voids or cells 12b for allowing the two layers of voids or cells 12a, 12b to communicate with each other. The holes 14 are formed at a certain interval along the lower layer of cells 12b. Also, in a ceiling wall 15 of the upper layer of voids 12a, there are formed a multiplicity of holes 16 having cross sections smaller than maximum cross sections of the upper layer of voids or cells 12a for allowing the upper layer of voids or cells 12a and the outside of the heat transfer wall to communicate with each other. The holes 16 are formed at a certain interval along the upper layer of cells 12a. Thus, by the holes 14, 16, the upper and lower layers of cells 12a, 12b and the outside of the heat transfer wall are communicated with one another. The intervals and sizes of the holes 14, 16 may be arbitrarily selected. It is understood that configurations of cross sections of the cells 12a, 12b and configurations of cross sections of the holes 14, 16 are not necessarily limited to those shown in the embodiment. Those factors may be suitably selected from circular, polygonal, rectangular and oblong shapes, as desired. However, in any case, the maximum value of the cross-sectional area of the cells 12a, 12b must be greater than the cross-sectional area of the respective holes 14, 16.

In the above-described structure, it is preferable to select a diameter d of the holes 14, 16 in a range of about 0.05 to 1.0 mm, a hole area ratio in a range of 0.01 to 0.3 and a hole pitch or interval in a range of about 1 to 20 holes/cm, respectively.

On the other hand, a capillary effect of the cells depends upon a width B and a height H of the cross section of the cells 12a, 12b. When the width B and the height H are too small, an entraining effect of liquid in the cells will be excessively large. Inversely, when the width B and the height H are too large, the capillary effect will become insufficient. In either case, a heat transfer will be adversely effected. In practical use, both the width B and the height H require 0.15 mm or more. Also, the cell pitch or interval is preferably selected from a range of about 1 to 20 cells/cm.

Figure 2:
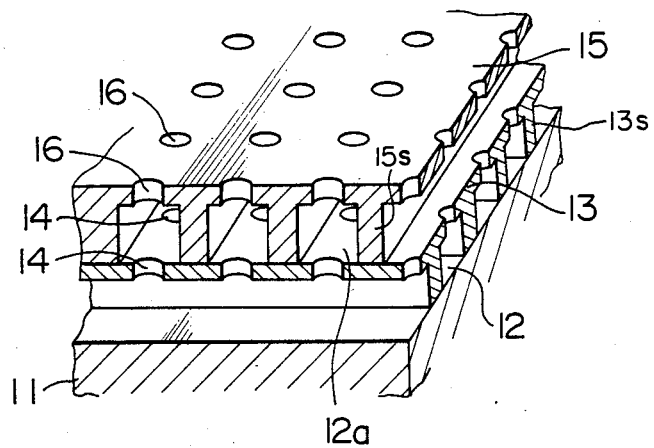

In an embodiment shown in FIG. 2, the upper and lower layers of cells 12a, 12b are intersected with each other at a predetermined angle. The other structural features are the same as those in the embodiment shown in FIG. 1.

Figure 3:
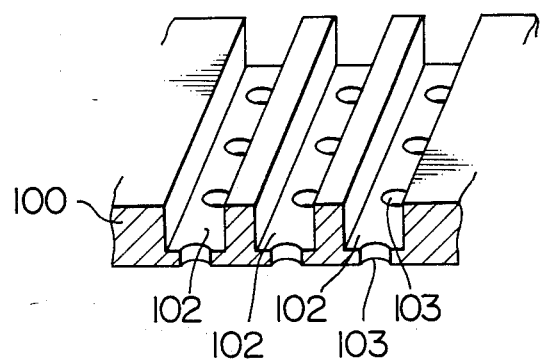
FIG. 3 is a perspective view, fragmentary in part, of a thin plate portion for illustrating a method of manufacturing the walls shown in FIGS. 1 and 2.

The heat transfer walls shown in FIGS. 1 and 2 may readily be manufactured as described below. As shown in FIG. 3, a thin planar plate 100 to form an outer surface of the heat transfer wall is provided with a multiplicity of elongated grooves 102 through a mechanical cutting-machining or a plastic machining such as a groove knurling. Holes 103 passing through the thin plate are formed in bottoms of the thus formed grooves at a predetermined interval. The holes 103 may be formed simultaneously with the formation of the groove-machining of the thin plate 100. The formation of the grooves 102 and the holes 103 may be carried out by well known processes such as chemical etching, laser beam machining and electronic beam machining. Two or more thin plates 100 having the multiplicity of grooves 102 and holes 103 are laminated on one another and are brought into intimate contact with or cemented on the base surface of the heat transfer wall, thereby forming a heat transfer surface structure according to the invention. If upon laminating, the grooves 102 of the upper and lower layers are arranged in parallel to each other in order not to clog the holes 103 of the thin plates 100, the wall shown in FIG. 1 may be produced. Also, the grooves 102 of the upper and lower thin plates are intersected with each other to form the heat transfer wall shown in FIG. 2.

In the embodiment shown in FIG. 1, if the upper and lower thin plates would be displaced with each other, there is a fear that the partitioning wall 13 of the upper and lower layers of cells would be damaged. However, in the embodiment shown in FIG. 2, even in such an occasion, the partitioning wall 13 between the upper and lower layers would not be damaged.

The operation and effect of the above-described embodiments will now be described in detail.

Figure 4:
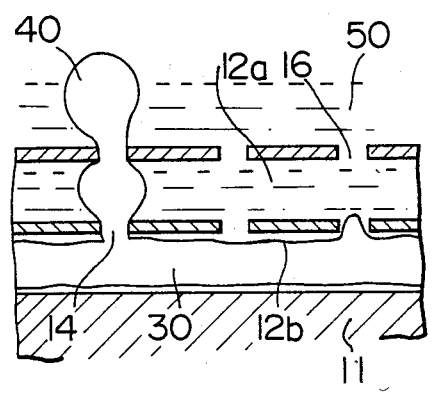
FIGS. 4 to 7 are cross-sectional views illustrating the operations of the embodiments.
Figure 5:
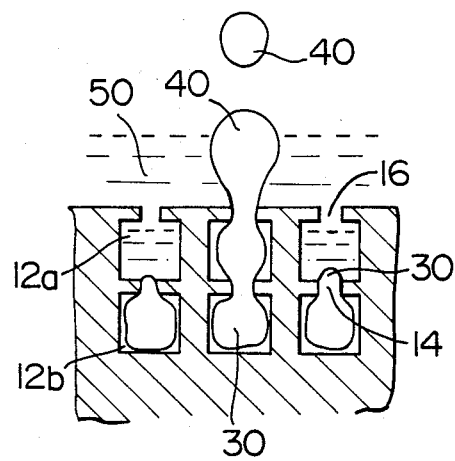

When the heat transfer surface is heated at a temperature higher than that of boiling liquid in contact with the surface as shown in FIGS. 4 and 5, evaporation bubbles 30 are generated in and occupy the cells 12a, 12b of the upper and lower layers. Then, when a pressure of vapor within the cells 12b of the lower layer is higher than that within the cells 12a of the upper layer, a part of the evaporation bubbles 30 will be discharged through the restricted holes 14 of the partitioning wall 13 to the cells 12a of the upper layer. The remainder of the bubbles are left in the cells 12b of the lower layer as residual evaporation bubbles. The cells 12a of the upper layer, on the other hand, receive the discharge of vapor from the voids or cells 12b of the lower layer, and new vapor will be generated by the heat of the cells 12a per se. Accordingly, a pressure within the cells 12a of the upper layer will be higher than that of outside liquid 50. Then, the vapor retained in the cells 12a of the upper layer will be discharged from the restricted holes 16 of the ceiling wall 15 to the outside as separating bubbles 40. The remainder of the vapor is retained in the cells 12a of the upper layer as residual vapor bubbles. The pressure in the cells is higher than that of the liquid 50 existing outside of the heat transfer wall and is gradually increased from the upper layer to the lower layer. In accordance with the discharge of the vapor from the cells 12a, 12b, the pressure within the respective cells 12a, 12b is changed whereupon liquid enters into the cells 12a, 12b. The outside liquid 50 enters into the cells 12a of the upper layer whereas a part of the entering liquid in the cells 12a enters into the cells 12b of the lower layer 12b. Accordingly, in the cells 12b in the lower layer, the pressure therein is kept at a higher level, and since the liquid to enter thereinto has passed through the cells 12a of the upper layer, a part of the liquid is heated and the amount thereof is restricted to a lower level. For this reason, even at a lower thermal load, the amount of the liquid 50 in the cells 12b is small, and in addition, since the liquid film sprayed or diffused on the inner walls of the cells 12b is thin, it is possible to generate vapor by a small degree of heat. In other words, at a lower heat load, the cells 12b of the lower layer are more available to enhance the heat transfer performance than the cells 12a of the upper layer, thereby increasing the heat transfer coefficient as a whole. It should be noted that when the width B and the height H of the cells are too small, a great amount of liquid is entrained into the cells 12b of the lower layer by the capillary force, resulting in restriction to the generation of vapor.

Figure 6:
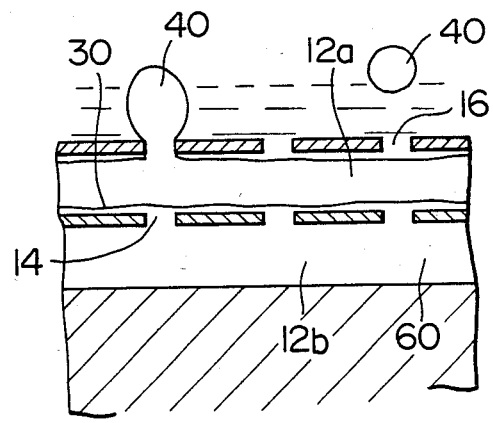
Figure 7:
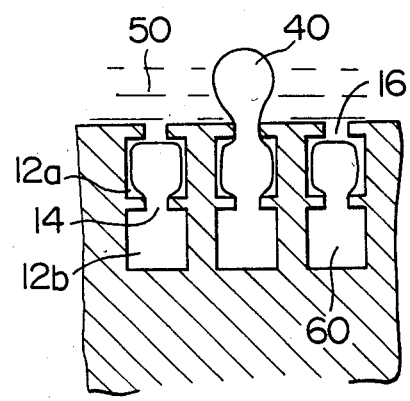

On the other hand, at a higher heat load, as shown in FIGS. 6 and 7, vapor 60 fills the cells 12b of the lower layer, it is difficult for liquid 50 to enter into the cells 12b, and a dry condition is maintained. However, since the invasion of the liquid is more easily achieved in the cells 12a of the upper layer than in the cells 12b of the lower layer, the cells 12a of the upper layer are hardly under the dry condition. If the size of the holes 16 for the upper layer is selected to be sufficiently large, even at the higher heat load, it is possible to keep the heat transfer performance at a higher level with only the cells 12a of the upper layer.

Accordingly, with the heat transfer surface according to the invention, the cells 12b of the lower layer act effectively at a lower thermal load whereas the cells 12a of the upper layer act effectively at a higher thermal load. Thus, the cells of the two layers act cooperatively against the respective thermal loads. It is of course possible to form three layers of cells but it is satisfactory to form two layers of cells. The size of the holes for the upper layer may be large and the size of the holes for the lower layer may be small.

Figure 8:
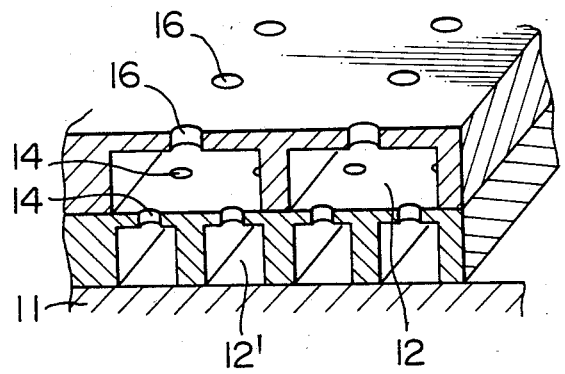
FIGS. 8 and 9 are perspective views showing other embodiments of the invention.

It is also possible to make a volume of the cells of the upper layer large and a volume of the cells of the lower layer small. For instance, this is attained by rendering a height of the cells 12a of the upper layer greater than that of the cells 12b of the lower layer. Otherwise, as shown in FIG. 8, it is sufficient that a transverse width of the cells of the upper layer is kept large and is twice the pitch of the cells of the lower layer, the other constructions are made unchanged. Incidentally, as in the structure shown in FIG. 2, if the cells belonging to the upper and lower layers are intersected with each other, it is possible to select an arbitrary value as the pitch of the cells of the upper layer with respect to the pitch of the cells of the lower layer. In any embodiment described above, at a higher thermal load, the outside liquid may be sufficiently entered into the cells of the upper layer so that the dry condition hardly occurs. Also, at a lower thermal load, the amount of liquid to enter into the cells of the lower layer is restricted, so that the thickness of the liquid film in the cells of the lower layer and the heat transfer performance is much more enhanced than in the embodiments shown in FIGS. 1 and 2.

Figure 9:
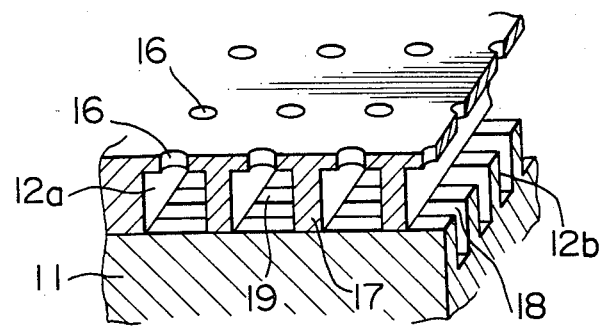

In an embodiment shown in FIG. 9, an inner wall constituting member for the cells of the upper layer is arranged so as to intersect with the groove-like cells of the lower layer, whereby restricted holes may be formed with respect to the maximum cross section of the cells of the lower layer.

In the case of the embodiment shown in FIG. 9, a multiplicity of elongated parallel grooves 18 are, in advance, formed on an outer surface of the base member 11 of the heat transfer wall. Thereafter, the thin plate 100 having a number of grooves 102 and holes 103 as illustrated in FIG. 3 is cemented on or brought into intimate contact with the base member 11 of the heat transfer wall so that the grooves 102 of the thin plate 100 and the grooves 18 of the base member 11 intersect with each other and confront each other, thereby forming the heat transfer wall shown in FIG. 9. In this case, the grooves 102 of the thin plate serve as the cells 12a of the upper layer and the grooves 18 of the base member 11 serve as the cells 12b of the lower layer. Each ridge 17 between the grooves 102 of the thin plate is adapted to partially cover the grooves 18 of the lower layer so that a plurality of rectangular holes 19 having cross sections smaller than the maximum cross-sectional area of the cells of the lower layer.

In any of the above-described embodiments, explanation has not been especially made as to a surface condition of the inner wall of cells. However, it is to be noted that if the inner wall surface is rougher than a planar smooth surface, the inner wall surface of cells tends to be wet with respect to the liquid and the liquid film may readily be spread or diffused. For this reason, the thickness of the liquid film formed on the inner wall surface of cells becomes thin and its heat transfer characteristic is much more enhanced than on the planar smooth surface. The surface roughness is preferably $R_p=0.0005$ to $0.002$ cm.

Figure 10:
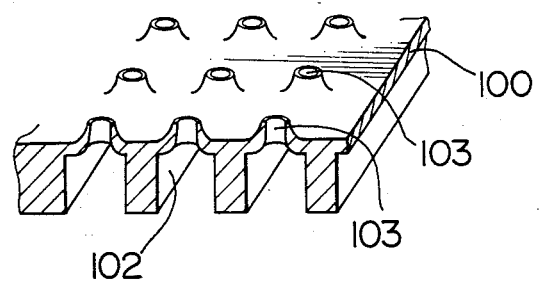
FIGS. 10 and 11 are views showing other examples of thin plates in accordance with the invention.
Figure 11:
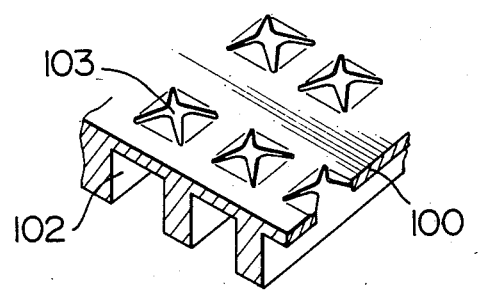

In embodiments shown in FIGS. 10 and 11, the thin plate 100 is provided with holes by rolling, knurling or die-machining, and the holes 103 are formed by punching or cutting. As a result, upon the formation of holes, barrier projections are formed on a surface opposite to the groove forming surface of the thin plate 100. For this reason, when a number of thin plates 100 having grooves and holes are laid one on another in a laminate fashion, the aligning work of the holes 103 of the lower layer and the grooves 102 of the upper layer may be facilitated. For example, a multiplicity of projections are formed at a tip end of a tooth of a grooving roll and a recess is formed on the associated plain roll in alignment with the projections whereby a thin plate is clamped between the two rolls and the rolls are pressingly rotated, so that the groove-forming and the hole-forming may be simultaneously carried out.

Figure 12:
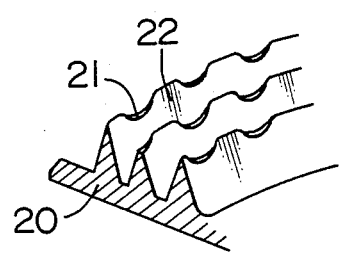
FIGS. 12 to 15 are views showing other embodiments of the invention and their manufacturing method.
Figure 13:
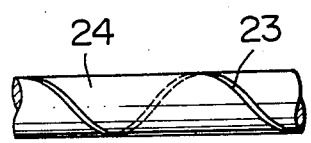
Figure 14:
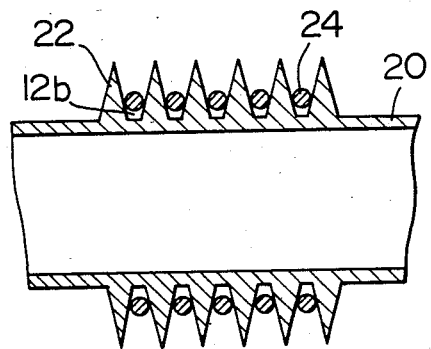
Figure 15:
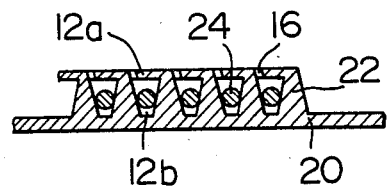

Another embodiment of the invention will be described with reference to FIGS. 12 to 15. In a first process, shallow recesses 21 are formed on an outer surface of a circular tube by knurling. The recesses are arranged in a direction forming an angle of about 45° with respect to the tube axis. Subsequently, in a second process, grooves and crests are formed in a direction perpendicular to the tube axis by using bites. A height of fins 22 formed through the above-described process is about 1 mm and is greater than that of the recesses 21 formed through the first process. According to this method, rows of the fins 22 having concave and convex portions as shown in FIG. 12 are formed. In a third process, a thin wire 24 having in its outer surface minute grooves 23 as shown in FIG. 13 is wound in the groove formed between the fins 22 to thereby offer a state shown in FIG. 14. Cells 12b are formed between the thin wire 24 and the fins 22 and the minute grooves 23 formed in the wire 24 serve as the holes. Incidentally, even if the thin wire 24 having no minute grooves 23 is wound in the grooves, there would be a possibility that a gap would be formed at contact portions between the thin wire and fins. However, it is preferable to form the minute grooves in the thin wire to ensure the formation of the holes. In a fourth process, tip ends of the fins 22 are bent as shown in FIG. 15 by rolling or brushing. The adjacent fins are brought into contact with each other whereby the cells 12a are formed. Then, the shallow recesses formed through the first process serve as the holes 16.

Figure 16:
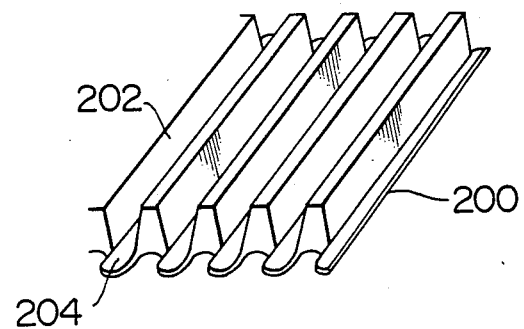
FIGS. 16 to 18 are views showing other embodiments of the invention and their manufacturing method.

In still another embodiment shown in FIG. 16, a multiplicity of elongated parallel grooves 202 having a minute dimension are formed on an elongated tape-like thin plate 200 forming an outer layer of the heat transfer wall. The above-described grooves 202 are manufactured through a machining method such as cutting or groove forming, a plastic machining such as rolling or pressing or a molding method such as casting. The holes 14' are larger than the holes 14 in size.

The selection of the forming methods described above depends upon the material constituting the thin plate 200. For example, the rolling process is available for material having an excellent ductility, such as copper, and the molding process is available for fragile material such as ceramics. In any of the processes, additional parts 204 are formed, in groove end portions at the same pitch as the grooves, at end faces of the tape-like thin plate 200. It should be noted that in the embodiment shown in FIG. 16, the structure is formed by rolling and is rolled by a fine pitch gear of involute gear shape and a plain roll in combination.

Figure 17:
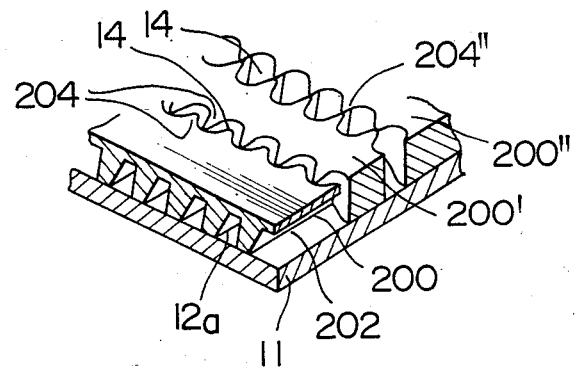

The above described elongated tape-like thin plates 200 shown in FIG. 16 are arranged regularly on the base member 11 of the heat transfer wall with the above-described grooves 202 being directed downwardly as shown in FIG. 17. In this case, the cells 12a just under the outer surface are formed by the grooves 202 and the base material 11 of the heat transfer wall and the holes 14, 14' are formed by the additional part 204 formed at the end face of the tape-like thin plate 200 and the end face of the other tape-like thin plate 200' adjacent to the thin plate 200.

Figure 18:
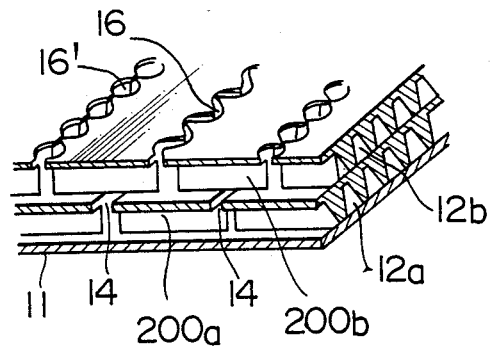

Subsequently as shown in FIG. 18, the elongated tape-like thin plates 200a, 200b are laid on the base member 11 of the heat transfer wall to form two layers. With such a heat transfer surface the combination of the cells and holes is also forming the upper and lower layers. Accordingly, the cells 12b are communicated with the cells 12a of the upper layer through the holes 14, 14' and the cells 12a of the upper layer are communicated with the outside boiling liquid through the holes 16, 16' for the upper layer.

Figure 19:
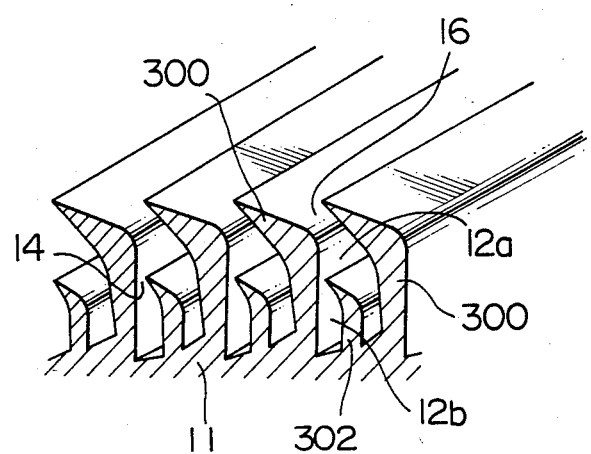
FIGS. 19 and 20 are views showing still other embodiments of boiling heat transfer walls in accordance with the invention.

Still another embodiment of the invention will now be described with reference to FIG. 19.

In the outer portion of the heat transfer wall 11, there are provided a multiplicity of elongated tunnel-like cells 12a, 12b forming double wall structure in parallel to each other. The inside cells 12b are partitioned from the outside cells 12a by smaller fins 302, and are communicated with the outside cells 12a through holes 14 formed between the smaller fins 302 and larger fins 300. The outer cells 12a are communicated with the outside of the heat transfer wall 11 through holes 16 formed at the adjacent fins 300'. On the other hand, the fins 300 and 302 are raised so that the cross sections of the above described holes 14, 16 are smaller than those of the cells 12b, 12a, respectively. The tip ends of the fins 300, 302 are not shaped in an aligned form such as a knife edge as shown in FIG. 19 according to the characteristics of metal material, and in those of curved, cracked, entrained or other irregular ends.

Figure 20:
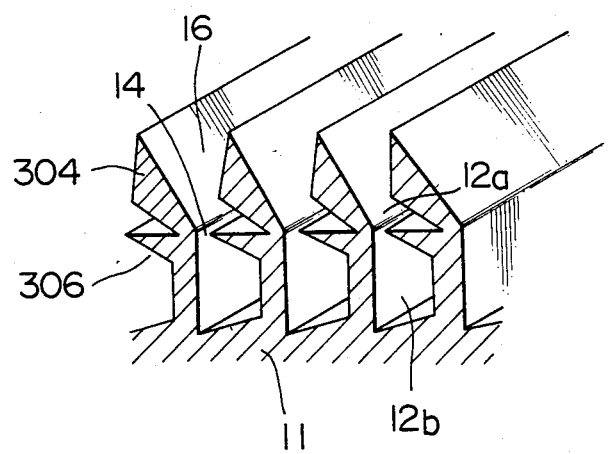

In another embodiment shown in FIG. 20, inside fins 306 are formed in the midway of the outer fins 304, and parts of the outer fins 304 are projected outside of the heat transfer wall 11. The other constructions are the same as in the embodiment shown in FIG. 19.

Figure 21:
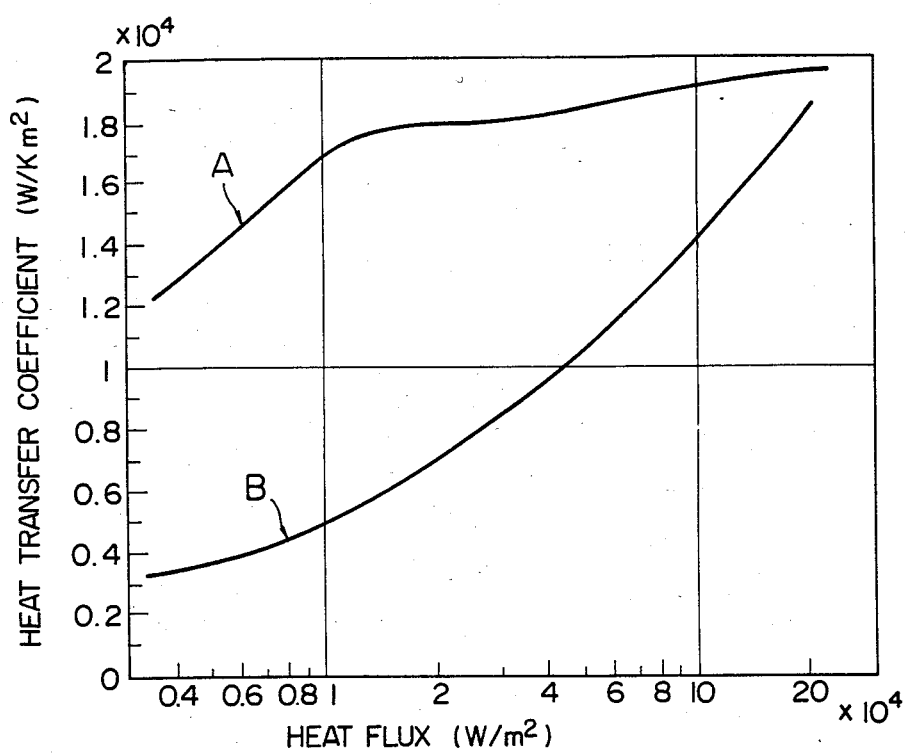
FIG. 21 is a graph showing a comparison result in heat transfer performance between the invention and the prior art.

To testify to the heat transfer ability of the heat transfer surface according to the invention, a boiling heat transfer experiment was carried out at an atmospheric pressure in accordance with the heat transfer surface shown in FIG. 1. A used boiling coolant liquid was $CFCl_3$ (Freon R-11). The heat transfer surface was made of copper. The same dimension was selected for the cells of the two layers, the cell pitch was 0.55 mm, the width B of the cells in cross section was 0.25 mm, the height H thereof was 0.4 mm, the hole pitch was 0.7 mm and the diameter of the holes was 0.25 mm. The heat transfer performance A is shown in FIG. 21. Also, in FIG. 21, there is shown the heat transfer performance B of the single layer type heat transfer surface, having the same cells and dimensions as those of the surface of the invention, the comparison surface being proposed in U.S. Pat. No. 4,060,125. The abscissa represent a heat flux q ($W/m^2$) of the standard or reference projection area of the heat transfer surface and the ordinate represent a heat transfer coefficient $\alpha$ ($W/K \cdot m^2$) of the reference projection area.

The heat transfer surface A according to the invention exhibited a high heat transfer coefficient exceeding the simple increasing degree (twice) of effective heat transfer area at the normal heat flux range ($5 \times 10^3 - 3 \times 10^4$ $W/m^2$) of the heat transfer surface in comparison with the prior art heat transfer surface B. In particular, the heat transfer coefficient of the invention reached a value three times larger than that of the prior art in the smaller range of the heat flux q. Also, according to the invention, over the whole heat flux range, the heat transfer coefficient was higher than that of the prior art heat transfer surface B and kept substantially constant heat transfer coefficient.

Incidentally, the heat transfer surface having the laminate structure of the invention may be made of material as in or different from the material constituting the outer portion constituting member of the heat transfer surface base member. For example, in the case where corrosive liquid will flow on the underside surface of the base material of the heat transfer surface of the invention, the anti-corrosive material is selected and used as the base member. However, the anti-corrosive material is, generally, difficult to be machined and is expensive. However, on the other hand, since material which is easy to be machined and is inexpensive may be selected as the heat transfer surface outer material, in comparison with the conventional heat transfer surface formed integrally, the heat transfer surface according to the invention has a remarkable advantage in industrial aspect.

As has been apparent from the foregoing description according to the invention, there are provided laminated cells and hole structures to the heat transfer surface, so that it is capable of carrying out the heat transfer under the optimum condition of the respective layer cells. For this reason, the heat transfer surface offers a high performance and uniform ability against the heat load in a wide range. Furthermore, according to the invention, the stable heat transfer surface may readily be produced.

What is claimed is:

1. In a heat transfer wall for transferring heat from an inner side of said wall to an outer side thereof by phase-converting a liquid brought into contact with said outer side of the wall, said heat transfer wall having a number of cells arranged regularly in an outer surface region of said wall and a plurality of independent holes for allowing the cells to communicate with the outer side of the heat transfer wall, said heat transfer wall characterized by comprising a plurality of layers of elongated cells, the layers being arranged adjacent one another along a direction from the outer side of said wall toward the inner side thereof, the individual cells of each layer of cells being partitioned from one another by side walls which extend generally along the direction of heat transfer through said wall and in a direction transverse to said inner and outer sides of said wall, a plurality of first holes for allowing the cells of the layer of cells closed to the outer side of said wall and the cells of the layer next closest to the outer side of said wall to communicate with each other, and a plurality of second holes for allowing the cells of the layer of cells closest to the outer side of said wall to communicate with the outer side of said heat transfer wall, and wherein the height of each of said cells is at least 0.15 mm.

2. The heat transfer wall as recited in claim 1, wherein cross-sectional areas of the respective holes are smaller than a maximum value of cross-sectional area of the cells disposed toward the inner side of the wall of the respective holes.

3. The heat transfer wall as recited in claim 1, wherein an inner surface of each of the cells is roughened.

* * * * *